United States Patent [19]

Biddlecombe

[11] Patent Number: 5,761,851
[45] Date of Patent: Jun. 9, 1998

[54] AUTOMOTIVE VEHICLE DOOR

[75] Inventor: David Biddlecombe, Sussex, England

[73] Assignee: Ford Global Technologies, Inc., Dearborn, Mich.

[21] Appl. No.: 722,003

[22] PCT Filed: Mar. 27, 1995

[86] PCT No.: PCT/GB95/00669

§ 371 Date: Sep. 30, 1996

§ 102(e) Date: Sep. 30, 1996

[87] PCT Pub. No.: WO95/27117

PCT Pub. Date: Oct. 12, 1995

[30] Foreign Application Priority Data

Mar. 30, 1994 [GB] United Kingdom ............... 94 06396

[51] Int. Cl.⁶ ............................................... B60J 5/04
[52] U.S. Cl. ....................................... 49/502; 49/352
[58] Field of Search ........................ 49/348, 349, 352, 49/502; 296/146.5, 146.1

[56] References Cited

U.S. PATENT DOCUMENTS

| | | | |
|---|---|---|---|
| 2,232,418 | 2/1941 | Warren | 49/349 X |
| 4,074,463 | 2/1978 | Colanzi | 49/349 X |
| 4,986,029 | 1/1991 | Richter | 49/349 |
| 5,012,613 | 5/1991 | Sekine | 49/349 X |
| 5,095,659 | 3/1992 | Benoit et al. | 49/502 |
| 5,584,144 | 12/1996 | Hisano | 49/502 |
| 5,588,260 | 12/1996 | Suzuki et al. | 49/502 |

FOREIGN PATENT DOCUMENTS

| | | |
|---|---|---|
| 2212767 | 8/1989 | United Kingdom . |
| 2230558 | 10/1990 | United Kingdom . |

*Primary Examiner*—Jerry Redman
*Attorney, Agent, or Firm*—David B. Kelley

[57] ABSTRACT

A vehicle door is designed so that it contains no internal wiring, even though some of the door functions are electrically operated. In particular, a window operating motor can be positioned so that its electrical connections to the vehicle power supply are accessible from the hinge shut face of the door, without needing to enter into the interior cavity of the door.

5 Claims, 2 Drawing Sheets

AUTOMOTIVE VEHICLE DOOR

BACKGROUND OF THE INVENTION

1. Field of the Invention

This invention relates to a vehicle door where at least some components associated with door operation are electrically operated.

2. Prior Art

The assembly of electrical wiring within the door cavity is expensive and time-consuming. In order to cut down the outlay involved in wiring the door, it has been proposed in British Patent Specification 2,212,767 to incorporate in the door construction a door cavity cover which has the desired arrangement of electrical conductors pre-formed on the surface of the cover.

Various mechanisms are known for raising and lowering a window in its guides. One known mechanism employs rigid plates hinged in a form of lazy tongs to raise or lower the window. An alternative known mechanism uses a Bowden cable, the inner cable of which passes around a drum which is turned by the motor, and is connected to an anchoring point on the window. Turning of the drum by the motor causes the end of the cable to raise or lower the window. One known form of cable mechanism is described in British Patent Specification 2,230,558. Alternatively, an electric window may be operated by a worm wheel mounted on a screw thread, the worm wheel being moved up or down the screw thread by turning of a motor. An example of such an electric window is described in European Patent Application 0348685.

A conventional vehicle door electric window winding mechanism is located in the door cavity, and is actuated by means of a switch. The motor for winding the window, together with any associated gearbox, is mounted in the door in a position corresponding to the position or a winding handle for a door with manually wound windows. The motor receives electric power by means of a wiring loom which passes through the door cavity.

The weight of components in the door cavity puts stress on the door hinges which may lead to fatigue and/or failure of one or more of the mounting components.

SUMMARY OF THE INVENTION

According to the present invention, there is provided a vehicle door having an electrically operated window, in which no electrical connections are made within the internal door cavity. The teachings of this invention can be applied to a vehicle door having electrically operated windows, wherein the door includes a motor for raising and lowering the windows, the motor being mounted in the door and having electrical terminals for providing power to the motor, which terminals are accessible from the hinge shut face of the door. The hinge shut face of the door is the face which mates with the A-pillar of the door when the door is closed. The door hinges are associated with this face.

By mounting the motor adjacent to the hinge shut Lace of the door the center of mass of the door may be brought closer to the hinges, thereby reducing stress on the hinges and other mounting elements. Any gearbox associated with the motor is mounted adjacent to the motor so that the center or gravity of the door is brought still closer to the hinges. However a remote gearbox may also be used, connected to the motor by a cable drive or other means. The motor may be mounted in the door cavity through an access opening in the hinge shut face of the door. The part of the motor which is then exposed at the hinge shut race may carry electrical terminals through which power is fed to the motor. The terminals may receive an end of a flying lead which can bridge the gap between the hinge shut face of the door and the A-pillar when the door is opened, but which can be housed between these faces when the door is closed.

Alternatively, the exposed face of the motor may carry terminals which will make electrical contact with a corresponding pair of terminals mounted on the A-pillar. In this case, electrical connection to the window operating motor will only be made when the door is closed. One set of terminals may spring-biased, so that the springs are compressed to hold the terminals in contact, when the door is closed.

The invention is suitable for use with any conventional mechanism for raising and lowering a window in its guides. For example, a lazy tongs mechanism, or a cable mechanism. The invention may be used with either single lift or double lift cable mechanisms. Depending on the preferred location of any gearbox associated with the motor, it may be necessary to provide some other mechanical mechanism within the door cavity to transmit the motor drive to the window itself, and this can be for example a cable drive or can be achieved by changing the geometry of the window mechanism operating arms.

DETAILED DESCRIPTION OF THE INVENTION

Figure 1:
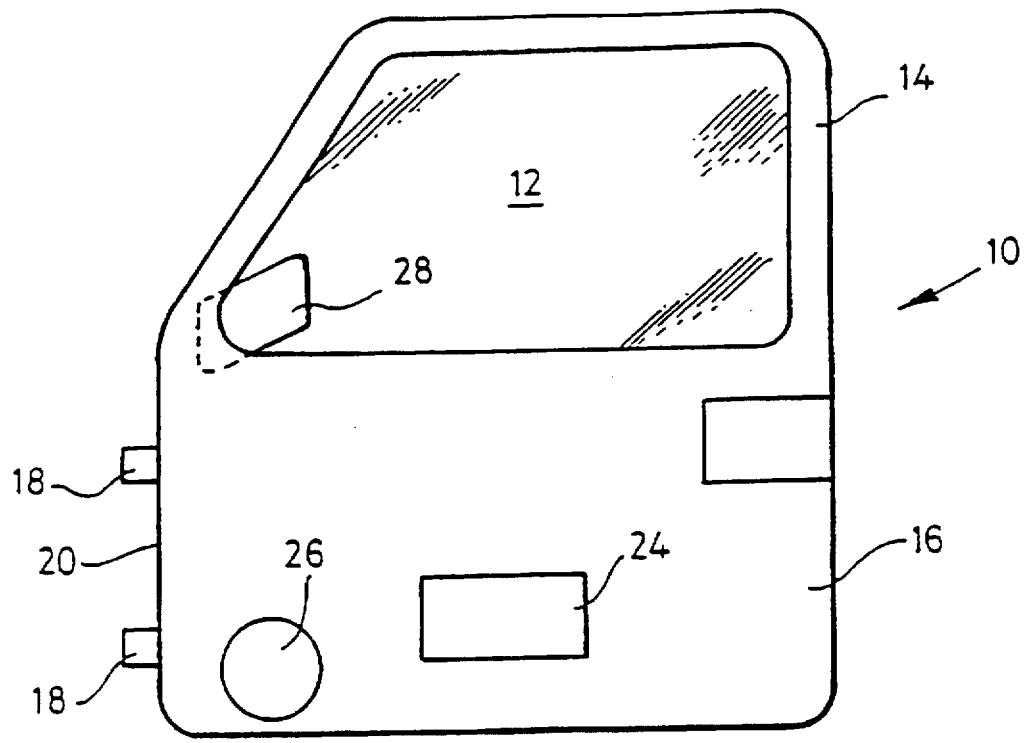
FIG. 1 is a schematic view of a vehicle door in accordance with the prior art.

The vehicle door 10 shown in FIG. 1 has a window 12 surrounded by a window frame 14 and a lower portion 16 formed by an inner and an outer skin which define between them a door cavity. The door will be hung in a vehicle by means of hinges 18 at a hinge shut face 20. Window glass 12 may be wound up and down by means of an electrically powered window motor 24. A loudspeaker 26 forming part of the car's audio system may be mounted in the door and a door mounted rear view mirror 28 is also provided. Each of these mechanisms 24, 26 and 28 requires electrical wiring to provide power and/or signal inputs to the mechanisms.

To avoid having to place any wires at all inside the door cavity, the present invention proposes to mount the rear view mirror 28 on the vehicle A-pillar and to mount the audio system speaker 26 either on the A-pillar or on the instrument panel or in the driver's footwell. Further, window motor 24 is moved to the hinge shut Lace 20 of the door and is provided with power as illustrated in either FIG. 2 or FIG. 3

Figure 2:
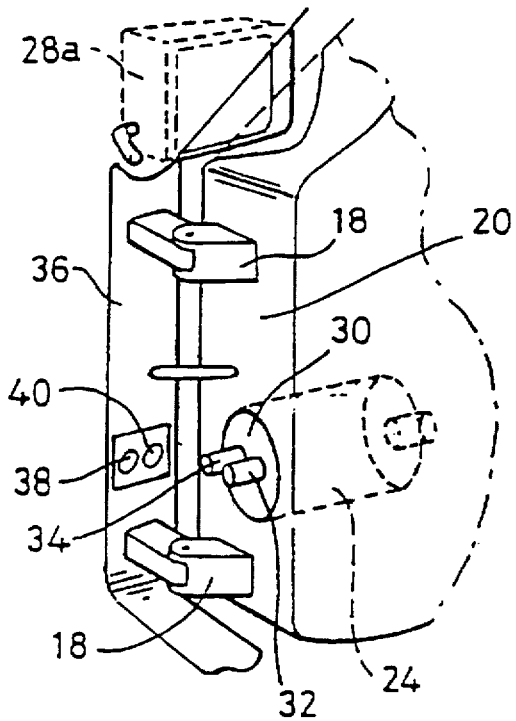
FIG. 2 shows part of a first embodiment of a door according to the invention.

FIG. 2 shows that the window motor 24 has been moved so that one end of the motor casing is exposed at the hinge shut face 20 of the door. This end face of the motor is denoted by reference 30 and carries two projecting, spring-loaded electrically conductive terminals 32, 34. On the A-pillar 36 are two corresponding terminal plates 38, 40 and when the door closes, the terminals 32, 34 will press against the plates 38, 40 respectively to make an electrical connection. Once in this condition, electrical power can be passed to the motor 24 to raise or lower the windows. Because the motor has been moved from a relatively central position within the door cavity to the edge of the door cavity, it may be necessary to provide some other mechanical mechanism within the door cavity to transmit the motor drive to the window itself, and this can be for example a cable drive or can be achieved by changing the geometry of the window mechanism operating arms.

Figure 3:
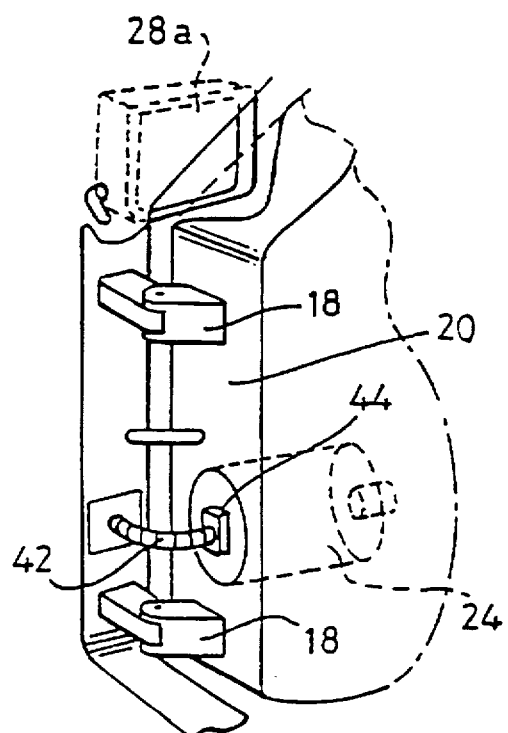
FIG. 3 is a view corresponding to FIG. 2 but showing a second embodiment of door in accordance with the invention.

Turning to FIG. 3, a flying lead 42 can be used connect motor 24 to the wiring harness in the vehicle in lieu of the spring-loaded terminals/contact plates scheme of FIG. 2. This allows operation of the window motor 24 when the door is open as well as when it is closed. Flying lead 42 can be protected by a flexible rubber boot where it extends between the A-pillar and the door itself. Lead 42 ends in a plug 44 which can be easily connected to a corresponding socket on the housing of the motor 24, where this housing is exposed at the hinge shut face 20 of the door.

In both the embodiments shown in FIGS. 2 and 3, the motor 24 can be mounted in the door by inserting it axially through an opening in the hinge shut face of the door. This does not require any access to the interior of the door cavity. FIGS. 2 and 3 also show a rear view mirror 28a mounted on the A-pillar 36 instead of an on-door mounting.

Figure 4:
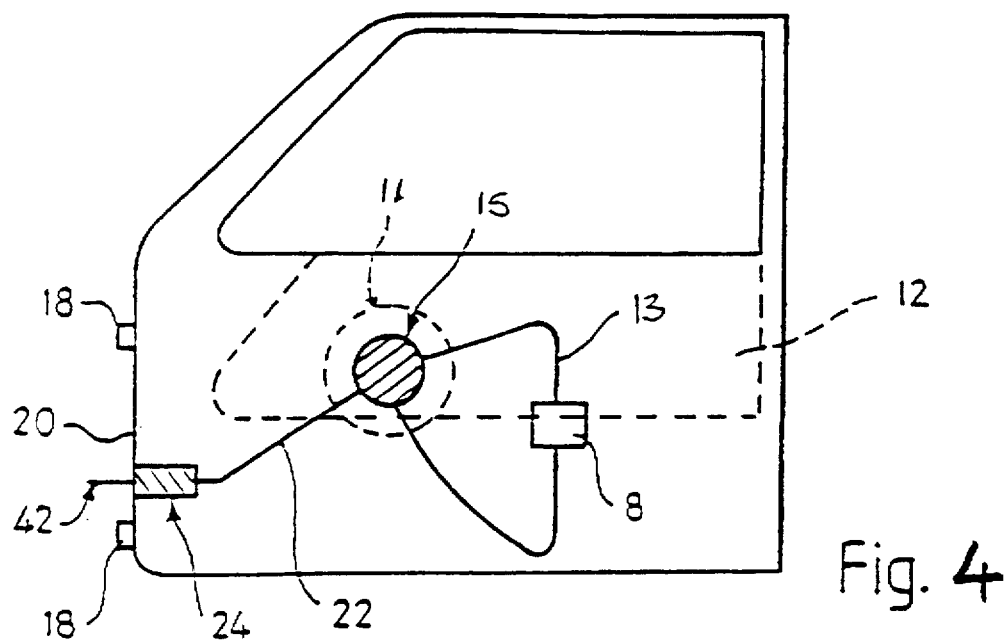
FIG. 4 is a schematic representation of a vehicle door in accordance with a first embodiment of the present invention.

The door shown in FIG. 4 has a window glass 12 which is slideably mounted in a pair of guides (not shown) so that the window glass 12 is moveable between a lower position in which the window is open, an upper position in which the window is closed, and any intermediate position. The window glass 12 is moved up or down by a window lift 8, the movement of which is controlled by a cable 13. The cable 13 is wound by means of the motor 24 and a gearbox 15. The motor 24 the and gearbox 15 directly substitute for a manual winding handle having a winding arc 11. The motor 24 is connected to the gearbox 15 by a Bowden cable 22. The vehicle wiring harness is connected to motor 24 by a flying lead 42 so that no electrical connections are made within the door cavity. Location of the motor 24 adjacent to the hinge shut face 20 of the door moves the center of mass of the door closer to the hinge shut face 20, and thereby reduces stress on the hinges 18 when the door is hung in a vehicle.

Figure 5:
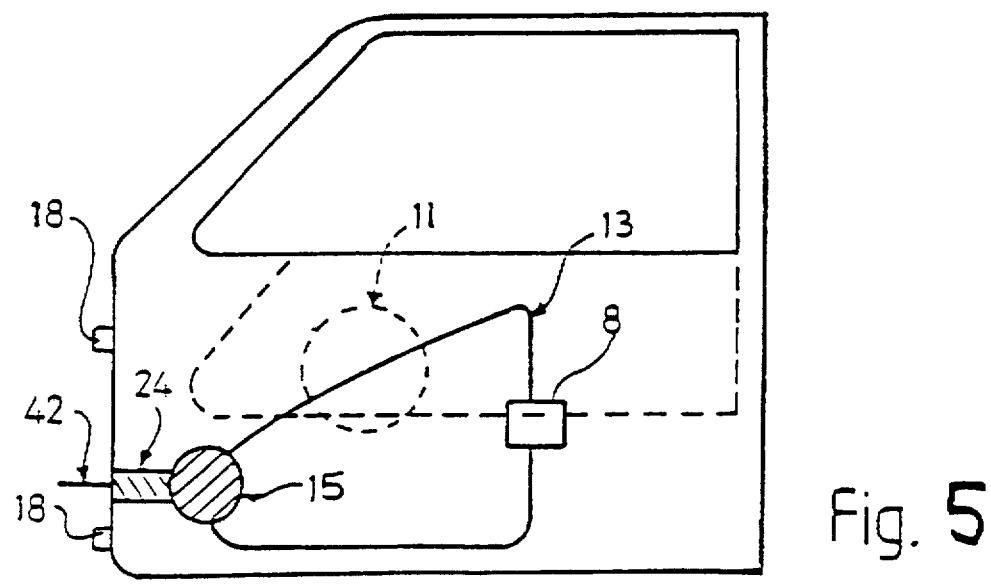
FIG. 5 is a schematic representation of a vehicle door in accordance with a second embodiment of the present invention.

The door shown in FIG. 5 is similar to the door of FIG. 4, but the gearbox 15 is now located adjacent to the motor 24 at the hinge shut face 20 of the door instead of in the region of the handle winding arc 11. This further shifts the center of mass of the door towards the hinges 18, and it avoids the need to use a connecting Bowden cable 22. The cable 13 is suitably repositioned within the door cavity for use with the new motor and gearbox arrangement.

The measures described make it possible to eliminate all internal wiring from the door, thus reducing door assembly time and cost and reducing complexity.

Although the preferred embodiment of the present invention has been disclosed, various changes and modifications may be made without departing from the scope of the invention as set forth in the appended claims.

I claim:

1. In an automotive vehicle having a vehicle body with an entryway therethrough, a vehicle door for covering said entryway when said vehicle door is in a closed position, said vehicle door comprising:

a hinge face having an inner panel connected on one edge thereof and an outer panel connected on an opposite edge thereof, said hinge face mating with a door mating surface on said vehicle body when said vehicle door is in the closed position, and said inner and outer panels defining a door cavity therebetween;

at least two hinges mounted on said hinge face connecting said vehicle door to said vehicle body; and an electrically-operated device mounted in said door cavity through an access opening of said hinge face having electrical connectors extending outwardly therefrom and in for contact with at least one terminal plate in then door mating surface so that when the vehicle door is in the closed position, an electric circuit is closed allowing electric power to the electrically operated device, and when the vehicle door is in an open position, the electrical connector is disengaged from the at least one terminal plate to open the electric circuit so that the electrically-operated device is electrically inoperable.

2. The door of claim 1, wherein said connectors comprise a plurality of electrical door terminals mounted on said hinge face through which power is supplied to said electrically-operated device.

3. The door of claim 1, wherein said body terminals have springs for biasing said door terminals so that said door terminals remain in contact with said body terminals when said door is in the closed position.

4. The door of claim 3, further comprising a window slideably disposed in said door cavity wherein said electrically-operated device comprises a motor for raising and lowering said window in said door cavity.

5. The door of claim 4, further comprising a gearbox adjacent said motor for transferring the power of the motor to said window for raising and lowering said window such that said motor may be disposed in said access opening of said hinge face.

* * * * *